United States Patent

Kawamura et al.

[11] Patent Number: 5,696,348
[45] Date of Patent: Dec. 9, 1997

[54] THERMOCOUPLE STRUCTURE

[75] Inventors: Hideo Kawamura, Samukawa; Hideki Kita, Fujisawa, both of Japan

[73] Assignee: Isuzu Ceramics Research Institute Co., Ltd., Kanagawa-ken, Japan

[21] Appl. No.: 710,416

[22] Filed: Sep. 17, 1996

[30] Foreign Application Priority Data

| Sep. 25, 1995 | [JP] | Japan | 7-269061 |
| Sep. 25, 1995 | [JP] | Japan | 7-269062 |
| Sep. 25, 1995 | [JP] | Japan | 7-269063 |

[51] Int. Cl.⁶ .................. H01L 35/04; H01L 35/20
[52] U.S. Cl. .......... 136/230; 136/201; 136/232; 136/233; 136/234; 136/236.1; 136/237; 374/139; 374/140; 374/179; 374/208
[58] Field of Search .................. 136/237, 225, 136/230, 232, 233, 234, 236.1, 201; 374/139, 140, 179, 208

[56] References Cited

U.S. PATENT DOCUMENTS

| 2,517,053 | 8/1950 | Thompson | 136/4 |
| 2,948,766 | 8/1960 | Schneider et al. | 136/5 |
| 3,011,006 | 11/1961 | Nicholson et al. | 136/5 |
| 3,317,353 | 5/1967 | Bingham | 136/233 |
| 3,451,860 | 6/1969 | Schwartzwalder et al. | 136/230 |
| 3,492,170 | 1/1970 | Davis et al. | 136/233 |
| 3,607,447 | 9/1971 | Davis et al. | 136/233 |
| 3,649,368 | 3/1972 | Sine | 136/232 |
| 4,029,472 | 6/1977 | Micheli et al. | 23/254 E |
| 4,238,957 | 12/1980 | Bailey et al. | 73/343 R |
| 4,460,802 | 7/1984 | Benedict et al. | 136/230 |
| 5,092,938 | 3/1992 | Kanda et al. | 136/230 |

FOREIGN PATENT DOCUMENTS

| 1054310 | 9/1991 | China . |
| 1648212 | 5/1972 | Germany . |
| 55-121972 | 9/1980 | Japan . |
| 61-246636 | 11/1986 | Japan . |
| 2217361 | 8/1990 | Japan . |
| 3-51726 | 3/1991 | Japan . |
| 1299995 | 12/1972 | United Kingdom . |
| 9304504 | 3/1993 | WIPO . |

*Primary Examiner*—Kathryn L. Gorgos
*Assistant Examiner*—Chrisman D. Carroll
*Attorney, Agent, or Firm*—Browdy and Neimark

[57] ABSTRACT

A thermocouple structure capable of measurement of a high temperature with a high accuracy is constituted of a protective pipe made of a heat-resistant ceramic; a pair of wires differing in kind and extending in the protective pipe from one end thereof to the other end thereof in the longitudinal direction thereof in a state of being spaced away from each other; a thin film constituting a temperature-sensing portion, made of a tungsten alloy, disposed on one end portion of said protective pipe, and connected to the wires; and a covering layer made of a heat-resistant ceramic and covering the thin film in such a way as to disallow exterior exposure of the thin film. The protective pipe is made of $Si_3N_4$, and a filling member made of a powder mixture of $Si_3N_4$ and TiN is filled in the protective pipe. Alternatively, a pair of printed strips differing in kind may be formed as wires in a protective pipe to provide such a thermocouple structure.

26 Claims, 6 Drawing Sheets

THERMOCOUPLE STRUCTURE

BACKGROUND OF THE INVENTION

1. Field of the Invention

The present invention relates to a thermocouple structure capable of temperature measurement with a high accuracy at high temperatures.

2. Description of the Prior Art

A conventional thermocouple, which was developed for the purpose of accurately measuring the temperature of a high-temperature liquid or gas, comprises 2 conductor wires differing in kind and having both ends thereof connected with each other, and makes a temperature measurement by placing the measuring junction thereof in an atmosphere as the object of temperature measurement while utilizing the principle that a difference in temperature between two points, i.e., the measuring junction and the other terminal, gives rise to an electromotive force. In the thermocouple, measuring materials having a variety of structure are adapted for the measurement of a temperature within the range of temperature between 300° C. and 1,400° C. Wires of the thermocouple are generally used in a state of being placed in a protective pipe because the wires are often oxidized or reduced in a high-temperature oxidizing or reducing atmosphere.

In the conventional thermocouple, for example, wires constituting the thermocouple and made of respective W—Re materials are passed through a protective $Al_2O_3$ pipe resistant to oxidation at high temperatures from one end thereof to the other end thereof in a state of being spaced away from each other, the tips of the wires are joined with each other, and the protective pipe wherein the wires are extended is filled with an insulating material such as MgO to protect the wires and prevent mutual contact of the wires to thereby secure a heat resistance.

On the other hand, a conventional protective pipe is made of a material as mentioned below. Usable examples of the conventional protective pipe include a sheath pipe made of heat resisting steel (heat-resisting temperature: 600° C.), and protective pipes respectively made of BN (heat-resisting temperature: 1,000° C.), porcelain (heat-resisting temperature: 1,400° C.), alumina (heat-resisting temperature: 1,600° C.), high chromium steel (heat-resisting temperature: 1,050° C.), and alundum (heat-resisting temperature: 1,400° C.). A thermocouple formed using such a protective pipe, when used up to the heat-resisting temperature thereof, is damaged only through a single measurement to become unreusable. Thus, such a thermocouple is usually used for temperature measurement in an atmosphere having a temperature of about 600° C. to about 800° C. or a high temperature of at most about 1,000° C.

Examples of a thermocouple having a protective pipe made of $Si_3N_4$ include those as disclosed in Japanese Patent Laid-Open No. 121,972/1980, Japanese Patent Laid-Open No. 246,636/1986, and Japanese Patent Laid-Open No. 217,361/1990.

An airtight silicon nitride sinter as disclosed in Japanese Patent Laid-Open No. 121,972/1980, which is applicable to the protective pipe of a thermocouple, has the surface thereof made airtight by moistening an $Si_3N_4$ sinter prepared by reaction sintering and having a specified bulk specific gravity in a moistened $N_2$ atmosphere in such a way as to provide a specified dew point, and then heat-treating the moistened sinter at 1,250° to 1,500° C.

A protective pipe for continuous temperature measurement of molten steel as disclosed in Japanese Patent Laid-Open No. 246,636/1986, which is usable as the protective pipe of a thermocouple, is a protective pipe which is produced by filling an AlN powder between a protective tube made of reaction-sintered silicon nitride and an inner alumina tube and further filling alumina wool on the top of the AlN powder, and in which case the temperature of molten steel can be measured for a long period of time with a decrease in the rate of erosion thereof by molten steel.

A reaction-sintered silicon nitride ceramic as disclosed in Japanese Patent Laid-Open No. 217,361/1990, which is usable as the protective pipe of a thermocouple, is produced by molding an Si powder and then reaction-sintering the resulting molding in an $N_2$ atmosphere at about 1,200° to about 1,600° C.

When such conventional protective pipes for protection of thermocouples are used at a temperature of at least 1,000° C., however, substantial damage is actually caused to the protective pipes. Thus, the fact is that the conventional thermocouples involve a difficulty in measuring a temperature either in a high-temperature furnace or of a molten metal. For example, where a thermocouple is constructed in the form of a pipe having a small diameter, problems concerning the production thereof arise for appropriate control of the strength of a protective pipe for protection of the thermocouple and the density of a filler in the protective pipe. On the other hand, the fact is that a thermocouple having a protective pipe made of BN is used for temperature measurement after evacuation of $O_2$ in a furnace because BN is oxidized in the presence of $O_2$.

Even in a structure wherein reaction-sintered silicon nitride is used to produce a protective pipe wherein a thermocouple is disposed, a pair of wires differing in kind are disposed extending in the protective pipe from one end thereof to the other end thereof in the longitudinal direction thereof. In this case, however, a suitable material must be selected as a filling member filled in the protective pipe because there otherwise arises a problem such as formation of a gap between the inner surface of the protective pipe and the filling member, infiltration of $O_2$ into the filling member to cause disconnection of the wires through oxidation thereof with $O_2$ present in the protective pipe, and/or damage to the wires by thermal shock.

In a thermocouple having a protective pipe made of $Al_2O_3$ as a conventional thermocouple, the heat-resisting temperature of $Al_2O_3$ is about 800° C. In the protective $Al_2O_3$ pipe, MgO filled therein is so porous that $O_2$ is liable to infiltrate into the porous MgO material, thereby presenting a problem that W-5% Re and W-26% Re for use in a thermocouple for high-temperature use are easily oxidized with existent $O_2$ to cause disconnection thereof. Accordingly, the thermocouple having the protective $Al_2O_3$ pipe involves many problems such as unavoidable sacrifice of the durability of the thermocouple for temperature measurement in a temperature atmosphere of at least 800° C., and use of any special techniques for temperature measurement.

SUMMARY OF THE INVENTION

An object of the present invention is to solve the foregoing problems, i.e., to provide a heat-resistant thermocouple structure excellent in thermal shock resistance and especially capable of temperature measurement with a high accuracy at high temperatures and with a high sensitivity by forming a protective pipe from a heat-resistant ceramic such as $Si_3N_4$ or SiC, forming thermocouple wires from tungsten (W)-rhenium (Re) alloys or platinum (Pt)-rhodium (Rh) alloys excellent in heat resistance, filling Si and Ti, or the like between the thermocouple wires and the protective ceramic pipe, and synthesizing $Si_3N_4$ and TiN to thereby seal the thermocouple wires in the protective pipe.

The present invention is directed to a thermocouple structure comprising a protective pipe made of a heat-resistant ceramic; a pair of conductor wires differing in kind and extending in the protective pipe from one end thereof to the other end thereof in the longitudinal direction thereof in a state of being spaced away from each other; a thin conductor film constituting a temperature-sensing portion, made of a tungsten alloy or the like, disposed on one end portion of the protective pipe, and connected to the wires; a covering layer made of a heat-resistant ceramic and covering the thin film in such a way as to disallow exterior exposure of the thin film; and a filling member made of $Si_3N_4$ and TiN, and filled in the protective pipe.

A lid material having apertures formed therethrough for respectively fitting tip portions of the wires therethrough may be fixed on an end portion of the protective pipe. The thin film may be attached to the lid material in such a way as to be connected to tips of the wires fitted through the apertures, while the covering layer may be formed by coating in such a way as to cover the thin film.

The thin film may be formed by applying a tungsten powder paste on the lid material, attaching the lid material to the protective pipe with the paste material therebetween, and effecting integral sintering thereof.

The covering layer may be worked to have a thickness of at most 0.5 mm in the portion thereof facing the thin film to thereby provide a structure capable of response with a high sensitivity.

One wire may be made of W-5% Re, while the other wire may be made of W-26% Re. The thin film may be a layer made of a pasty coating of a mixed powder of W with Mo or Ti. Further, an insulating layer made of a ceramic powder may be formed around the periphery of any one of the wires by coating.

The wires may be coated with a paste of an $Si_3N_4$ powder dispersed in a resin material or a fat and oil material to form lead members.

The lead members of the wires may be inserted into a pair of the through-holes of a perforated calcined member comprising $Si_3N_4$ and TiN. The calcined member having the wires inserted into the through-holes thereof is fitted into the protective pipe, and subjected to integral sintering.

This thermocouple structure may be produced by forming a columnar member made of $Si_3N_4$ and TiN and having the wires included therein in a state of juxtaposition parallel with each other without mutual contact thereof, then calcining the columnar member, fitting the calcined columnar member into the protective pipe, and effecting integral sintering thereof.

This thermocouple structure can be used for temperature measurement, for example, in a high-temperature furnace, ceramic sintering, high-pressure gas heat treatment, an iron smelting furnace, an Al or the like melting furnace, etc.

Since this thermocouple structure is constituted as described above, and has the thin film disposed as the temperature-sensing portion on an end portion of the protective pipe made of a heat-resistant ceramic excellent in thermal shock resistance and the thin covering layer formed by coating to cover the temperature-sensing portion, there can be provided a heat-resistant and durable thermocouple excellent in thermal shock resistance and capable of measuring the temperature of a gaseous or liquid object of temperature measurement with a very high sensitivity and with a high accuracy even when the object has a high temperature.

Further, in this thermocouple structure, the powder comprising Si and Ti and filled in the protective silicon nitride pipe, when sintered in $N_2$ gas, forms a composite of $Si_3N_4$ with TiN while involving no sintering shrinkage of the powder unlike common ceramics but a little expansion thereof through conversion thereof into a nonshrinkable ceramic. Further, when a calcined member of the above-mentioned powder filled in the protective pipe having the wires inserted thereinto is sintered, the filling member of the nonshrinkable ceramic uniformly fills up in the protective pipe with the conductor wires being wrapped up in the filling member to join the protective pipe to the filling member in a state of close adhesion therebetween due to substantially the same coefficient of linear thermal expansion of the filling member and the wires, whereby no gap is formed between the filling member and the protective pipe. Accordingly, infiltration of $O_2$ into the protective pipe does not occur, and disconnection of the wires, attributable to either a difference in thermal expansion or oxidation thereof, does not occur, while the external temperature can be transferred to the wires in a short time. Furthermore, the thermocouple structure has a heat resistance, an excellent thermal shock resistance and a good durability.

The present invention is also directed to a thermocouple structure comprising a protective pipe made of a heat-resistant ceramic; a pair of conductor wires differing in material and extending in the protective pipe from one end thereof to the other end thereof in the longitudinal direction thereof in a state of being spaced away from each other; a temperature-sensing conductor portion connected to ends of the wires and formed in one end portion of the protective pipe; connectors respectively provided for the wires protruding from the other end portion of the protective pipe; and a filling member made of a mixed material of $Si_3N_4$ and TiN, and filled in the protective pipe.

The protective pipe may be made of $Si_3N_4$ containing $Y_2O_3$, $Al_2O_3$ and $SiO_2$, and may have perforations formed across the wall thereof and arranged in the longer direction of the protective pipe in a state of being spaced away from each other. The surfaces of the filling member intruded into the perforations may be coated with $Si_3N_4$ to form coating layers for prevention of gas passage either into or from the protective pipe via the perforations.

The protective pipe may alternatively be made of SiC. When the protective pipe is made of SiC, coating layers as mentioned above are also preferably made of SiC from the viewpoint of joining and coefficient of thermal expansion.

The wires may be formed as curved parallel wires for absorption of a difference thereof from the filling member in coefficient of thermal expansion.

The temperature-sensing portion formed in an end portion of the protective pipe may be constituted of a lid member for occlusion of the end portion of the protective pipe. The lid member may be made of the same material as in the protective pipe.

In order to fix a fitting around an end portion of the protective pipe, the exposed surface areas of the filling member in the perforations formed across the wall of the protective pipe may be coated with an Ag—Cu—Ti powder, with which the fitting can be sealed to the filling member. The mixed material of $Si_3N_4$ and TiN is well diffused into Ag—Cu—Ti to enable a good joining state to be secured.

A glass layer comprising $Y_2O_3$, $Al_2O_3$ and $SiO_2$, and having a good affinity for $Si_3N_4$ may be applied on an end portion of the protective pipe on the side of connectors to hermetically seal the end portion of the protective pipe.

Since this thermocouple structure is constituted of the protective pipe made of a ceramic and the temperature-sensing conductor portion hermetically sealed by the silicon nitride lid material in an end portion of the protective pipe as described above, it is resistant to heat, resistant to corrosion and excellent in thermal shock resistance to be suitable for temperature control of and temperature measurement in high-temperature furnaces such as a molten metal furnace, a plasma melting furnace and an electric furnace.

Since the fitting fixed around an end portion of the protective pipe is strongly fixed to the protective pipe made of the insulating material, there can be provided a heat-resistant durable thermocouple excellent in thermal shock resistance.

Since the wires are protected by the protective pipe while being strongly held by the filling member, a stable reliable thermocouple excellent in durability and capable of temperature measurement with a high accuracy can be provided, which is suitable for measurement of high temperatures in an oxidizing or reducing atmosphere in particular.

Another object of the present invention is to provide a heat-resistant durable thermocouple structure excellent in thermal shock resistance by disposing a ceramic insulating element in a protective pipe to densely fill up the space in the protective pipe, disposing printed thermocouple strips respectively made either of tungsten (W)-rhenium (Re) alloys or platinum (Pt)-rhodium (Rh) alloys on the periphery of the insulating element, and sealing the printed thermocouple strips in the protective pipe.

Thus, the present invention is further directed to a thermocouple structure comprising a protective pipe made of a heat-resistant ceramic; a columnar insulating element made of a TiN—$Si_3N_4$ composite material and fitted in the protective pipe; a pair of printed strips differing in material and printed on the periphery of the insulating element in such a way as to extend from one end thereof to the other end thereof in the longitudinal direction thereof in a state of being spaced away from each other; a temperature-sensing portion connected to ends of the printed strips and formed in one end portion of the protective pipe; and connectors provided on the other end portion of the protective pipe and respectively connected to the printed strips.

The insulating element may be constituted of a columnar substrate disposed in the protective pipe and an insulating covering element covering the periphery of the substrate and made of a TiN—$Si_3N_4$ composite material.

One printed strip may be made of W-5% Re, while the other printed strip may be made of W-26% Re.

The temperature-sensing portion may be constituted of a thin $Si_3N_4$ or SiC film formed on an end portion of the protective pipe by coating and sintering.

The connectors provided on an end portion of the protective pipe may be constituted of lead wires respectively connected to the printed strips by metallization thereof with an Ag—Cu—Ti powder. Further, the printed strips are respectively joined to the lead wires in such a way as to avoid mutual short-circuit thereof on an $Al_2O_3$ tube disposed around the outer periphery of a portion of the insulating element protruding from the protective pipe.

The exposed surface areas of the insulating element where the printed strips are not printed may be adhered to the inner surface of the protective pipe.

Since this thermocouple structure has the protective pipe made of $Si_3N_4$ chosen as the material of the protective pipe for protection of a thermocouple, the insulating element made of a composite material of $Si_3N_4$ mixed with TiN, and a pair of the printed strips printed on the periphery of the insulating element in areas thereof accounting for at most ½ of the circumference thereof from one end of the insulating element to the other end thereof with a paste of a powder of finely pulverized W—Re while connecting the pair of the printed strips to each other by printing the whole circumference of an end portion of the insulating element with the above-mentioned paste, provided that the insulating element having the printed strips is fitted into the protective pipe and sintered, there can be provided a thermocouple very excellent in durability and reliability in high-temperature atmospheres.

Since the insulating element filled in the protective pipe is made of an $Si_3N_4$—TiN composite material formed by mixing an Si powder with 10 to 15% Ti and sintering the resulting mixture in $N_2$ gas, and involves no sintering shrinkage but rather a little expansion through sintering to secure close adhesion of the insulating element to the protective $Si_3N_4$ pipe to thereby check the infiltration of $O_2$ into the regions of the printed strips positioned between the protective pipe and the insulating element and hence the disconnection, by oxidation, of the printed thermocouple strips, there can be provided a stable reliable thermocouple improved in durability with a high accuracy of temperature measurement.

Since this thermocouple structure is constituted of the protective pipe made of a ceramic and the temperature-sensing portion formed in an end portion of the protective pipe as described above, it is resistant to heat, resistant to corrosion and excellent in thermal shock resistance in particular to be suitable for temperature control of and temperature measurement in high-temperature furnaces such as a molten metal furnace, a plasma melting furnace and an electric furnace.

This thermocouple structure is suitable for measurement of high temperatures in an oxidizing or reducing atmosphere. Since a fitting fixed around an end portion of the protective pipe is strongly fixed therearound, there can be provided a heat-resistant durable thermocouple excellent in thermal shock resistance.

Since this thermocouple structure is resistant to heat and excellent in thermal shock resistance as described above, it can be repeatedly used. Furthermore, this thermocouple structure is greatly decreased in production cost, running cost, etc. as compared with conventional ones made using a material such as BN.

DETAILED DESCRIPTION OF THE EMBODIMENT

Figure 1:
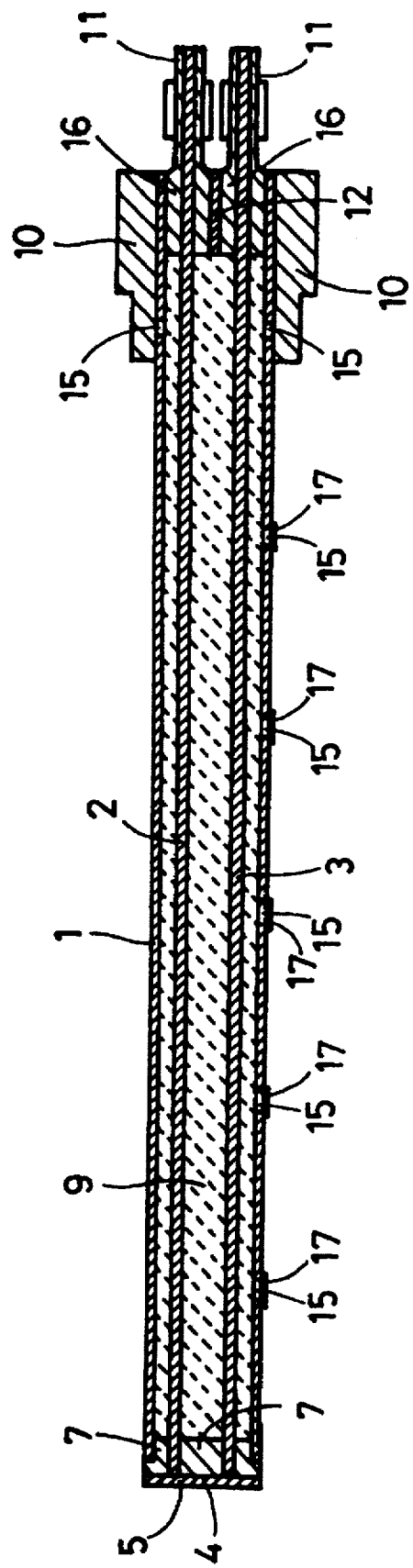
FIG. 1 is a cross-sectional view illustrating an example of the thermocouple structure of the present invention.
Figure 2:
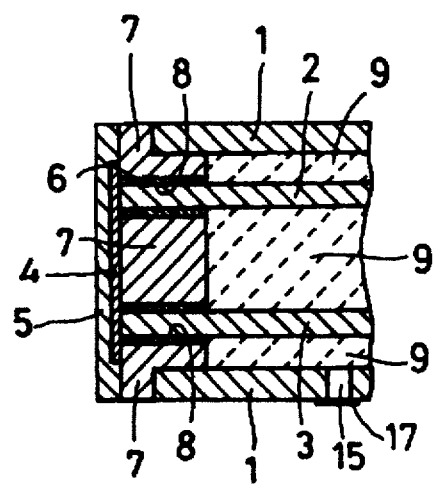
FIG. 2 is an enlarged cross-sectional view illustrating a first example of an end portion in the thermocouple structure of FIG. 1.
Figure 3:
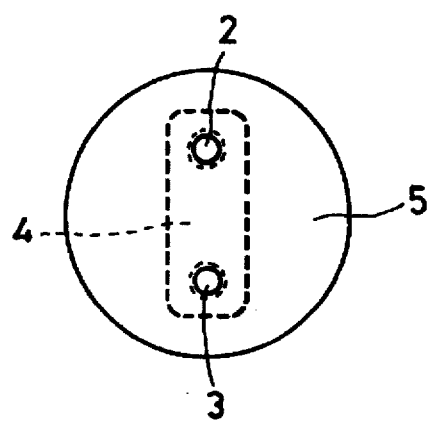
FIG. 3 is a side view illustrating an end of the thermocouple structure of FIG. 1.
Figure 4:
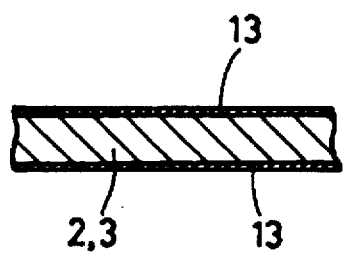
FIG. 4 is an enlarged cross-sectional view illustrating part of a wire in the thermocouple structure of FIG. 1.
Figure 5:
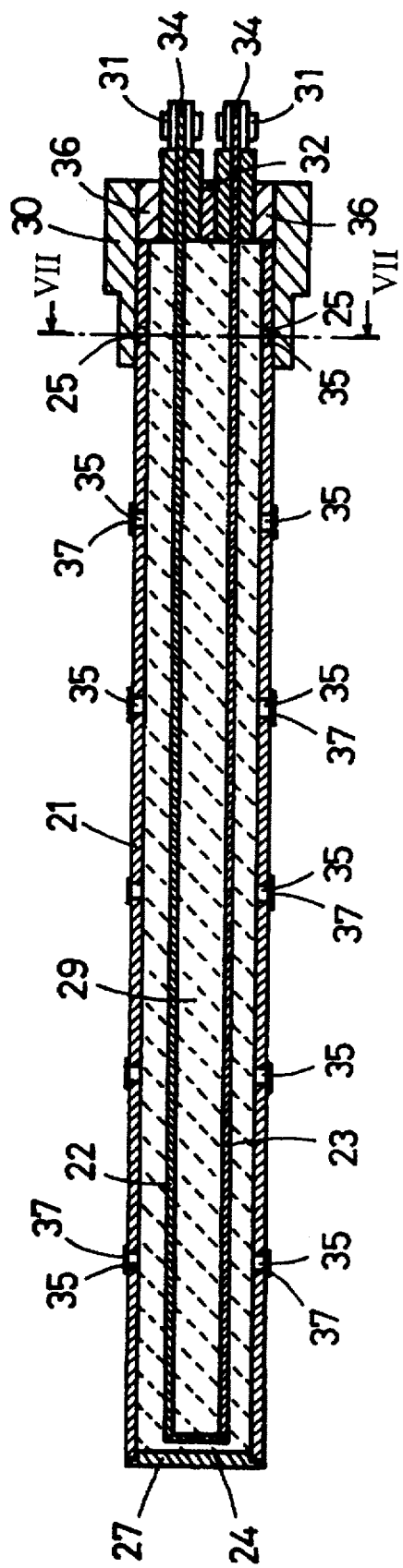
FIG. 5 is a cross-sectional view illustrating a second example of the thermocouple structure of the present invention.
Figure 6:
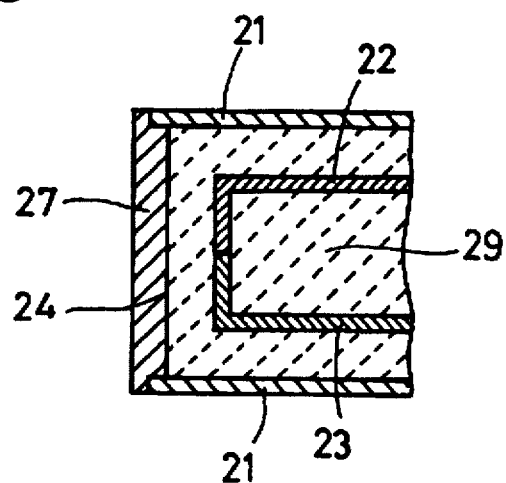
FIG. 6 is an enlarged cross-sectional view illustrating an end portion in the thermocouple structure of FIG. 5.
Figure 7:
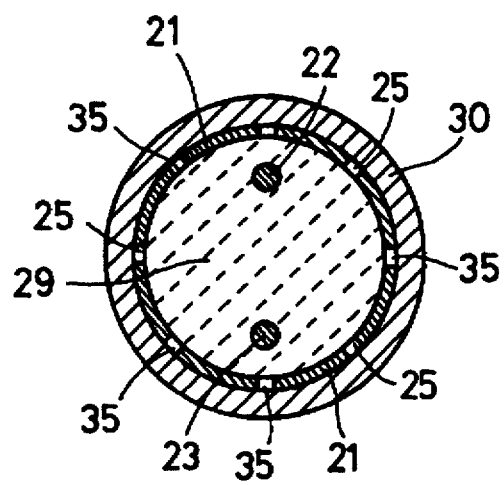
FIG. 7 is a cross-sectional view taken along line VII—VII of FIG. 5.
Figure 8:
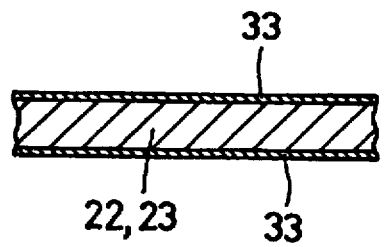
FIG. 8 is an enlarged cross-sectional view illustrating part of a wire in the thermocouple structure of FIG. 5.

Examples of the thermocouple structure of the present invention will now be described with reference to the accompanying drawings. A first example of the thermocouple structure of the present invention will be described while referring to FIGS. 1, 2, 3 and 4.

This thermocouple structure mainly comprises a protective pipe 1 made of a ceramic excellent in heat resistance, corrosion resistance and thermal shock resistance; a pair of conductor wires 2, 3 differing in kind and extending in the protective pipe 1 from one end thereof to the other end thereof in the longitudinal direction thereof in a state of being spaced away from each other; a thin conductor film 4 constituting a temperature-sensing portion, made of a tungsten alloy, disposed on one end portion of the protective pipe 1, and connected to the wires 2, 3; and a covering layer 5 made of a heat-resistant and dense ceramic and covering the thin film 4 in such a way as to disallow exterior exposure of the thin film 4. A fitting 10 for attaching a thermocouple to other part is fixed around the other end of the protective pipe 1. On the side of the fitting 10, terminal fitting portions 11 of the wires 2, 3 are protruding, and the fitting portions 11 are constructed in such a way as to be connected with the terminals of a temperature-measuring apparatus. The fitting portions 11 of the wires 2, 3 are insulated from each other with an insulating member 12.

The protective pipe 1 is made of $Si_3N_4$ or silicon carbide SiC resistant to heat and excellent in thermal shock resistance, and is perforated to form a large number of perforations 15 spaced away from each other and arranged in the longitudinal direction of the protective pipe 1. Where the protective pipe 1 is made of $Si_3N_4$, a filling member 9 made of a composite material formed from a powder mixture of Si and Ti is filled in the protective pipe 1. When a powder mixture of $Si_3N_4$, Si and Ti is filled in the protective $Si_3N_4$ pipe 1 and then sintered, a filling member 9 made of a nonshrinkable ceramic composite material is formed without any gap and the like formed between the protective pipe 1 and the filling member 9 to provide a very stable thermocouple structure.

In this thermocouple structure, for example, a powder mixture of 90 wt. % of an Si powder and 10 wt. % of a Ti powder, optionally mixed with a little $Si_3N_4$ powder, is filled in the protective silicon nitride pipe 1, and then subjected to integral sintering in an $N_2$ atmosphere to form the filling member 9. In this case, when a plurality of perforations 15 are formed across the wall of the protective pipe 1 and arranged in the longitudinal direction thereof, the integral sintering of the powder mixture of Si and Ti encased in the protective pipe 1 brings about a reaction of Si with Ti to form a nonshrinkable ceramic composite material made of $Si_3N_4$ and TiN. That is, the powder mixture is formed into the nonshrinkable ceramic composite material made of $Si_3N_4$ and TiN without sintering shrinkage. In this case, the fitting 10 and a glass layer 16 can be attached to one end portion of the protective pipe 1, while a lid material 7 can be attached to the other end portion thereof. The fitting 10 is strongly fixed to the protective pipe 1 through the integral sintering since the above-mentioned powder mixture is intruded into and filled in the perforations 15 formed across the wall of the protective pipe 1.

This thermocouple structure can be constructed by placing the wires each in the form of a gentle spiral with a large pitch as well as a slurry of the powder mixture of Si and Ti into a gypsum mold having substantially the same diameter as that of the protective pipe 1 to form a columnar member, drying the columnar member, calcining the dried columnar member, fitting the calcined columnar member into the protective pipe, and effecting integral sintering thereof.

After the integral sintering, the exposed surface areas of the composite material filled in the perforations 15 may be covered by coating layers 17 of $Si_3N_4$. Thus, the composite material, i.e., the filling member 9, in the protective pipe 1 constitutes a protective film for the wires 2, 3. In this case, a pair of the wires 2, 3 differing in kind are disposed in the above-mentioned powder mixture, followed by integral sintering thereof in an $N_2$ atmosphere, whereby the protective film can be formed. Alternatively, the filling member 9 may be first formed and then perforated to form through-holes extending from one end of the filling member 9 to the other end thereof, and a pair of the wires 2, 3 differing in kind may then be inserted into and passed through the respective through-holes.

A tungsten (W) wire is a high-melting material having a thermal expansion coefficient of $4.6 \times 10^{-6}/K$. Since the coefficient of thermal expansion of $Si_3N_4$ is $3.1 \times 10^{-6}/K$, $Si_3N_4$ and W are closely similar to each other in thermal expansion coefficient. Thus, use of the two in combination for formation of a thermocouple is preferable from the standpoint of the coefficient of thermal expansion.

The lid material 7 having apertures 8 formed for fitting therethrough respective tip portions of the wires 2, 3 is fixed on and in an end portion of the protective pipe 1. The thin conductor film 4 for mutual connection therewith of the tips of the wires 2, 3 fitted through the apertures 8 with thin conductor films 6 therebetween is attached to the lid material 7. The covering layer 5 is formed by coating in such a way as to cover the thin film 4. The thin film 4 is formed by applying a paste of a tungsten powder on the lid material 7, attaching the lid material 7 to the protective pipe 1 with a paste material therebetween, and then effecting integral sintering thereof. Further, the covering layer 5 is worked to have a thickness of at most 0.5 mm in the portion thereof facing the thin film 4.

One wire 2 is made of W-5% Re, while the other wire 3 is made of W-26% Re. Besides W—Re, the wires 2, 3 may respectively be made either of platinum and platinum-rhodium in combination, or of W and WMo (Mo: 25%) in combination. The thin films 4, 6 are formed from pasty coating layers of a powder of W mixed with Mo (molybdenum), Mn (manganese) and/or Ti (titanium) to electrically connect the wire 2 with the wire 3 through sintering thereof. The lid material 7 is made of silicon carbide SiC or $Si_3N_4$. When the lid material 7 is to be made of $Si_3N_4$, it is preferably made of a nonshrinkable ceramic formed as a composite material of $Si_3N_4$ and TiN by mixing $Si_3N_4$ with a Ti powder in an aspect of joining. On the other hand, coating layers 13 made of a paste of an $Si_3N_4$ powder dispersed in a resin material or a fat and oil material are formed around the wired 2, 3 by coating to form lead members. The coating layers 13 prevent short-circuit of the wires 2, 3 in the protective pipe 1.

This thermocouple structure may alternatively be formed in the following manner. The lead members of the wires 2, 3 are inserted into a pair of through-holes formed through a calcined member of $Si_3N_4$ containing TiN. The calcined member having the wires 2, 3 inserted into the through-holes thereof is fitted into the protective pipe 1, followed by integral sintering thereof, whereby the thermocouple structure can be formed. In this case, the surface of the calcined member is coated with a paste of a powder of Si and Ti, and the coated calcined member is inserted into the protective pipe 1 and subjected in such a state to integral sintering, whereby the calcined member is converted into the filling member 9 while sealing the filling member 9 to the protective pipe 1 with strong adhesion therebetween. The calcined member can be fired without pressure thereon to form the filling member 9 made of a $Si_3N_4$-TiN ceramic, i.e., a nonshrinkable ceramic, with a little expansion thereof through the firing in accordance with the blending proportion of the components of the above-mentioned powder.

A second example of the thermocouple structure of the present invention will now be described while referring to FIGS. 5, 6, 7 and 8.

This thermocouple structure mainly comprises a protective pipe 21 made of a heat-resistant and corrosion-resistant ceramic; a pair of conductor wires 22, 23 differing in kind and extending in the protective pipe 21 from one end thereof to the other end thereof in the longitudinal direction thereof in a state of being spaced away from each other; a temperature-sensing conductor portion 24 connected to ends of the wires 22, 23 and formed in one end portion of the protective pipe 21; connectors 31 respectively provided for the wires 22, 23 protruding from the other end portion of the protective pipe 21; and a filling member 29 made of a mixed material of $Si_3N_4$ and TiN, and filled in the protective pipe 21.

A lid member 27 is fixed onto the one end portion of the protective pipe 21 to occlude the end portion thereof. The lid member 27 constitutes the temperature-sensing portion 24. A fitting 30 for attaching a thermocouple to other part is fixed around the other end portion of the protective pipe 21. The connectors 31 are provided around the fitting portions 34 of end portions of the wires 22, 23 protruding on the side of the fitting 30. The connectors 31 are constructed in such a way as to be connected with the terminals of a temperature-measuring apparatus. The fitting portions 34 of the wires 22, 23 are insulated from each other with an insulating member 32.

The protective pipe 21 is formed in the same manner as in the first example. Where the protective pipe 21 is to be made of $Si_3N_4$, the filling member 29 which is made of a mixed material of $Si_3N_4$ and TiN (titanium nitride) is filled in the protective pipe 21. The mixed material is sintered to form the filling member 29 made of a nonshrinkable ceramic, whereby a very stable thermocouple structure can be provided.

In this thermocouple structure, for example as the filling member 29, a powder mixture of 90 wt. % of an Si powder and 10 wt. % of a Ti powder, optionally mixed with a little silicon nitride powder, is filled in the protective silicon nitride pipe 21, and then subjected to integral sintering in an $N_2$ atmosphere. In this case, when a plurality of perforations 35 are formed across the wall of the protective pipe 21 and arranged in the longitudinal direction thereof, the integral sintering of the powder mixture of Si and Ti encased in the protective pipe 21 brings about a reaction of Si with Ti to form a nonshrinkable ceramic composite material made of $Si_3N_4$ and TiN. That is, the powder mixture is formed into the nonshrinkable ceramic composite material made of $Si_3N_4$ and TiN without sintering shrinkage. Subsequently, the fitting 30 and a glass layer 36 are attached to one end portion of the protective pipe 21, and the lid member 27 is attached to the other end portion thereof, whereby a thermocouple can be produced. After the sintering, the perforations 35 may be covered by coating layers 37 of $Si_3N_4$. Thus, the composite material constitutes a protective film for the wires 22, 23. In this case, a pair of the wires 22, 23 differing in kind are disposed in the above-mentioned powder mixture, followed by integral sintering thereof in $N_2$ atmosphere, whereby the protective film can be formed. Alternatively, the filling member 29 may be first formed and then perforated to form through-holes extending from one end of the filling member 29 to the other end thereof, and a pair of the wires 22, 23 differing in kind may then be inserted into and passed through the respective through-holes.

One wire 22 is made of W-5% Re, while the other wire 23 is made of W-26% Re. Further, an insulating layer made of a ceramic powder is formed around the periphery of any one of the wires 22, 23 by coating. Insulating layers 33 made of a paste of an $Si_3N_4$ powder dispersed in a resin material or a fat and oil material are formed around the wires 22, 23 by coating to form lead members. Meanwhile, a tungsten (W) wire is a high-melting material having a coefficient of thermal expansion of $4.6\times10^{-6}$/K. Since the coefficient of thermal expansion of $Si_3$ is $3.1\times10^{-6}$/K, $Si_3N_4$ and W are closely similar to each other in the coefficient of thermal expansion. Thus, use of the two in combination for formation of a thermocouple is preferable from the standpoint of the coefficient of thermal expansion.

Since the filling member 29 is different, though a little, in the coefficient of thermal expansion from the wires 22, 23, however, the wires 22, 23 are sometimes disconnected through changes in the amounts of thermal expansion of the filling member 29 and the wires 22, 23 at a high temperature because of a difference therebetween in thermal expansion. Thus, the wires 22, 23 are preferably bent in such a spiral form as to be able to absorb the difference in thermal expansion.

The protective pipe 21 is made of $Si_3N_4$ containing $Y_2O_3$, $Al_2O_3$ and $SiO_2$. The protective pipe 21 is perforated to form a large number of the perforations 35 spaced away from each other and arranged in the longitudinal direction of the protective pipe 21. The surfaces of the filling member 29 intruded into the perforations 35 are provided with $Si_3N_4$ coating layers 37 formed by coating. The coating layers 37 check gas passage either into or from the protective pipe 21 via the perforations 35 to prevent infiltration of $O_2$ into any gap between the protective pipe 21 and the filling member 29 and into the filling member 29.

In order to fix the fitting 30 around an end portion of the protective pipe 21, the exposed surface areas of the filling member 29 in the perforations 35 formed across the wall of the protective pipe 21 are coated with an Ag—Cu—Ti powder filler 25 to seal the fitting 30 to the filling member 29. In a certain case, a filler 25 constituting the filling member 29 is filled up in the perforations 35 of the protective pipe 21 in the fitting surface between the protective pipe 21 and the fitting 30. In this case, the fitting 30 can be firmly adhered and sealed to the protective pipe 21 by integral sintering thereof for effecting conversion of the filler 25 into the composite material. The glass layer 36 comprising $Y_2O_3$, $Al_2O_3$ and $SiO_2$ is applied on an end of the protective pipe 21 on the side of the connectors 31 to hermetically seal the end portion of the protective pipe 21.

On the other hand, besides W—Re, the wires 22, 23 may respectively be made either of platinum and platinum-rhodium in combination, or of W and WMo (Mo: 25%) in combination. The lid member 27 is made of silicon carbide SiC or $Si_3N_4$. When the lid member 27 is to be made of $Si_3N_4$, it is preferably formed as a nonshrinkable ceramic by mixing $SiN_4$ with a TiN powder.

Figure 9:
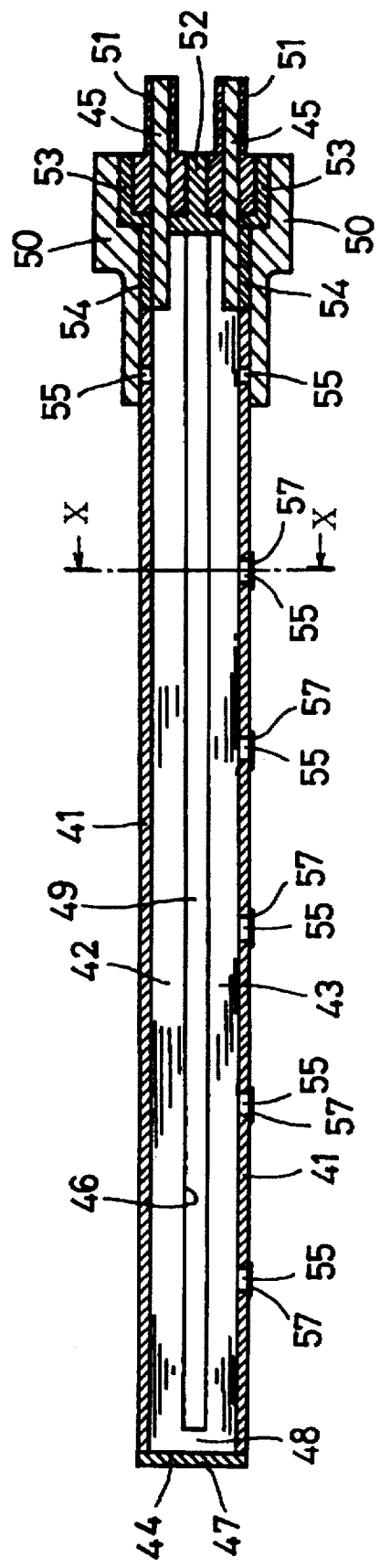
FIG. 9 is a cross-sectional view illustrating a third example of the thermocouple structure of the present invention.
Figure 10:
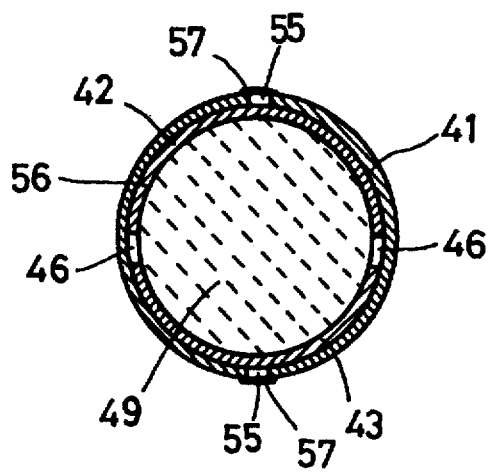
FIG. 10 is an enlarged cross-sectional view taken along line X—X of FIG. 9 and illustrating the third example.
Figure 11:
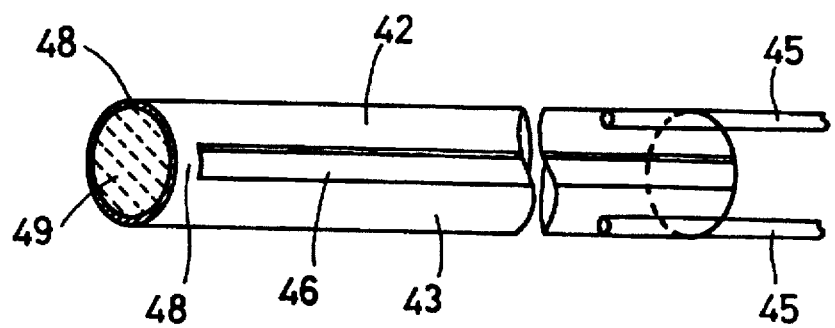
FIG. 11 is a perspective view illustrating an insulating element having printed strips formed on the surface thereof and lead wires joined to the insulating element in the thermocouple structure of FIG. 9.

A third example of the thermocouple structure of the present invention will now be described while referring to FIGS. 9, 10 and 11.

This thermocouple structure mainly comprises a protective pipe 41 made of a heat-resistant and corrosion-resistant ceramic; a columnar insulating element 49 made of a TiN—$Si_3N_4$ composite material and fitted in the protective pipe 41; a pair of printed conductor strips 42, 43 differing in kind and printed on the periphery 56 of the insulating element 49 in such a way as to extend from one end thereof to the other end thereof in the longitudinal direction thereof in a state of being spaced away from each other; a printed conductor ring 48 constituting a temperature-sensing portion 44, connected to ends of the printed strips 42, 43, and formed in one end portion of the protective pipe 41; and connection wires 45 constituting connectors 51 provided on the other end portion of the protective pipe 41 and respectively connected to the printed strips 42, 43. One printed strip 42 is made of a W-5% Re material, while the other printed strip 43 is made of a W-26% Re material. The printed ring 48 is made of W—Re.

Besides W—Re, the printed strips 42, 43 as well as the printed ring 48 may respectively be made either of platinum and platinum-rhodium in combination, or of W and WMo (Mo: 25%) in combination. On the other hand, the temperature-sensing portion 44 is formed by sintering a thin $Si_3N_4$ or SiC film formed in an end portion of the protective pipe 41 by coating.

The connectors 51 provided on an end portion of the protective pipe 41 are constituted of connection wires, i.e., lead wires 45, respectively connected to the printed strips 42, 43 by metallization thereof with a silver solder material or an Ag—Cu—Ti powder. The printed strips 42, 43 and the lead wires 45 are joined to an $Al_2O_3$ tube 54 disposed around the periphery of a portion of the insulating element 49 protruding from the protective pipe 41 in such a way as to avoid mutual short-circuit of the printed strips 42, 43. Further, the unprinted surfaces of the insulating element 49 without the printed strips 42, 43 thereon, i.e., the exposed portions 46 of the periphery 56 of the insulating element 49, are adhered to the inner surface of the protective pipe 41.

A fitting 50 for attaching a thermocouple to other part is fixed around an end portion of the protective pipe 41. The fitting portions of end portions of the lead wires 45 protruding on the side of the fitting 50 constitutes a pair of the connectors 51 insulated with an insulating element 52. The connectors 51 are constructed in such a way as to be connected with the terminals of a temperature-measuring apparatus. The fitting 50 is joined to the protective pipe 41 when a paste of a powder of Si and Ti filled in perforations 55 of the protective pipe 41 is sintered to be converted into a composite material. Both are strongly adhered and sealed to each other with the composite material.

The protective pipe 41 is made of $Si_3N_4$ or silicon carbide SiC resistant to heat, resistant to corrosion and excellent in thermal shock resistance. Where the protective pipe 41 is to be made of $Si_3N_4$, the insulating element 49 fitted in the protective pipe 41 is preferably made of a mixed material comprising $Si_3N_4$ and titanium nitride TiN. When the insulating element 49 as a filling member of the mixed material of $Si_3N_4$ and TiN is disposed in the protective $Si_3N_4$ pipe 41, an insulating element 49 made of a nonshrinkable ceramic is formed through sintering of the mixed material without any gap and the like formed between the protective pipe 41 and the insulating element 49 to provide a very stable thermocouple structure.

A tungsten (W) wire is a high-melting material having a coefficient of thermal expansion of $4.6\times10^{-6}$/K. Since the coefficient of thermal expansion of $Si_3N_4$ is $3.1\times10^{-6}$/K, $Si_3N_4$ and W are closely similar to each other in coefficient of thermal expansion. Thus, use of the two in combination for formation of a thermocouple is preferable from the standpoint of coefficient of thermal expansion.

Besides $Si_3N_4$, the protective pipe 41 may be made of $Si_3N_4$ containing $Y_2O_3$, $AlO_3$ and $SiO_2$. The protective pipe 41 is perforated to form a large number of perforations 55 spaced away from each other and arranged in the longitudinal direction of the protective pipe 41. A powder mixture comprising Si and Ti as the main components is filled in the perforations 55, and subjected to integral sintering in an $N_2$ atmosphere to be converted into a nonshrinkable ceramic, thereby strongly joining the protective pipe 41 to the insulating element 49. In this case, the surfaces of the resulting filling members of the composite material filled in the perforations 55 is coated with $Si_3N_4$ to form coating layers, which check gas passage either into or from the protective pipe 41 via the perforations 55.

In order to fix the fitting 50 around an end portion of the protective pipe 41, the exposed surface areas of the insulating element 49 in the perforations 55 formed across the wall of the protective pipe 41 are coated with an Ag—Cu—Ti powder to seal the fitting 50 to the insulating element 49. A glass layer 53 comprising $Y_2O_3$, $Al_2O_3$ and $SiO_2$ is applied on an end of the protective pipe 41 on the side of the connectors 51 to hermetically seal the end portion of the protective pipe 41.

In this thermocouple structure, for example, the insulating element 49 as a core may be produced by sintering a powder mixture of 90 wt. % of an Si powder and 10 wt. % of a Ti powder, optionally mixed with a little silicon nitride powder, in an $N_2$ atmosphere to bring about a reaction of Si with Ti to thereby form a nonshrinkable ceramic composite material of $Si_3N_4$ and TiN. That is, the powder mixture is formed into the nonshrinkable ceramic composite material made of $Si_3N_4$ and TiN without sintering shrinkage. Subsequently, the printed conductor strips 42, 43 differing in kind are formed on the outer periphery of the insulating element 49 by printing, while the printed conductor ring 48 is formed on an end portion of the insulating element 49 by printing. Subsequently, the surface of the insulating element 49 having the printed conductor films is coated with a paste of a powder mixture of 90 wt. % of an Si powder and 10 wt. % of a Ti powder, and the coated insulating element 49 is fitted into the protective pipe 41 made of silicon nitride, followed by integral sintering thereof in an $N_2$ atmosphere to convert the paste into a nonshrinkable ceramic composite material made of $Si_3N_4$ and TiN, whereby the insulating element 49 can be sealed to the protective pipe 41. In this case, when a large number of perforations 55 are formed across the wall of the protective pipe 41 in such a way as to be arranged in the longitudinal direction thereof, the integral sintering of the powder mixture of Si and Ti encased in the protective pipe 41 brings about a reaction of Si with Ti to form the nonshrinkable ceramic composite material made of $Si_3N_4$ and TiN. After the sintering, the perforations 55 may be occluded with $Si_3N_4$ coating layers 57. Thus, the insulating element 49 made of the composite material in the protective pipe 41 constitutes a protective film for the printed conductor strips 42, 43 as wires.

Figure 12:
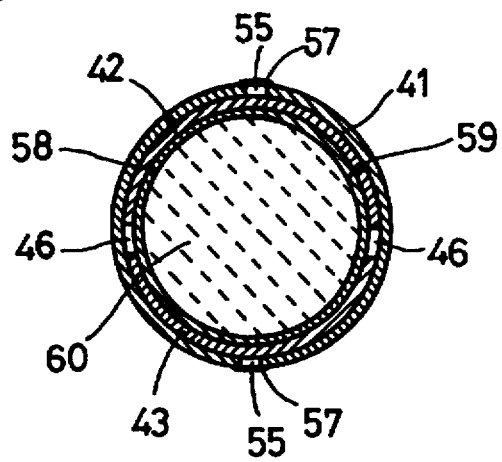
FIG. 12 is an enlarged cross-sectional view taken along line X—X of FIG. 9 and illustrating a fourth example.

A fourth example of the thermocouple structure of the present invention will now be described while referring to FIG. 12. The thermocouple structure of the fourth example has the same constitution as in the foregoing example except for the structure of insulating element. Thus, the same reference numerals are attached to the same parts, and any redundant explanations are dispensed with.

In the thermocouple structure of the fourth example, an insulating element 59 corresponding to the insulating element 49 is constituted of a columnar substrate 60 fitted in a protective pipe 41, and an insulating covering element 58 made of a composite material of $Si_3N_4$ and TiN and covering the periphery of the substrate 60. Further, the outer surface of the insulating covering element 58 around the insulating element 59 is provided with a pair of printed strips 42, 43 differing in kind, formed thereon by printing, and extending from one end thereof to the other end thereof in the longitudinal direction thereof in a state of being spaced away from each other. The insulating element 59 having the insulating covering element 58 having the printed strips 42, 43 formed thereon by printing is fitted into the protective pipe 41, followed by integral sintering thereof, whereby the insulating element 59 can be sealed to the protective pipe 41.

What is claimed is:

1. A thermocouple structure comprising a protective pipe made of a heat-resistant ceramic; a pair of conductor wires differing in material and extending in said protective pipe from one end thereof to the other end thereof in the longitudinal direction thereof in a state of being spaced away from each other; a thin conductor film constituting a temperature-sensing portion, made of a tungsten alloy, disposed on one end portion of said protective pipe, and connected to said conductor wires; a covering layer made of a heat-resistant ceramic and covering said thin conductor film to disallow exterior exposure of said thin conductor film; and a filling member including $Si_3N_4$ and TiN, and filled in said protective pipe to wrap said conductor wires up therein.

2. A thermocouple structure as claimed in claim 1, wherein said filling member including $Si_3N_4$ and TiN is sintered without shrinkage thereof and without formation of any gap between the inner surface of said protective pipe and the periphery of said filling member to be in close contact with said protective pipe.

3. A thermocouple structure as claimed in claim 1, wherein a lid material having apertures formed therethrough for respectively fitting tip portions of said conductor wires therethrough is put between an end portion of said protective pipe and said thin conductor film, and said lid material is covered with said covering layer.

4. A thermocouple structure as claimed in claim 3, wherein said thin conductor film is formed by applying a tungsten powder paste on said lid material, attaching said lid material to said protective pipe with said paste material therebetween, and effecting integral sintering thereof.

5. A thermocouple structure as claimed in claim 1, wherein said covering layer is worked to have a thickness of at most 0.5 mm in the portion thereof facing said thin conductor film.

6. A thermocouple structure as claimed in claim 1, wherein one of said conductor wires includes W-5% Re, and the other conductor wire includes W-26% Re.

7. A thermocouple structure as claimed in claim 1, wherein said thin conductor film is a layer including a pasty coating of a mixed powder of W with Mo or Ti.

8. A thermocouple structure as claimed in claim 1, wherein said conductor wires are coated with a paste of an $Si_3N_4$ powder dispersed in a resin material or a fat and oil material to form lead members.

9. A thermocouple structure as claimed in claim 8, wherein said filling member is produced by inserting lead members of said conductor wires into a pair of through-holes of a perforated calcined member comprising $Si_3N_4$ and TiN, fitting said calcined member having said conductor wires inserted into said through-holes thereof into said protective pipe, and effecting integral sintering thereof.

10. A thermocouple structure as claimed in claim 1, wherein said filling member is produced by forming a columnar member including $Si_3N_4$ and TiN and having said conductor wires each in the form of a spiral with a large pitch included therein, then calcining said columnar member, fitting the calcined columnar member into said protective pipe, and effecting integral sintering thereof.

11. A thermocouple structure comprising a protective pipe including a heat-resistant ceramic; a pair of conductor wires differing in kind and extending in said protective pipe from one end thereof to the other end thereof in the longitudinal direction thereof in a state of being spaced away from each other; a temperature-sensing conductor portion connected to ends of said conductor wires and formed in one end portion of said protective pipe; connectors respectively provided for said conductor wires protruding from the other end portion of said protective pipe; and a filling member made of a mixed material of $Si_3N_4$ and TiN, and filled in said protective pipe to wrap said conductor wires up therein.

12. A thermocouple structure as claimed in claim 11, wherein said protective pipe includes $Si_3N_4$ containing $Y_2O_3$, $Al_2O_3$ and $SiO_2$, and has perforations formed across the wall of said protective pipe and arranged in the longitudinal direction thereof in a state of being spaced away from each other, while the surfaces of the filling member intruded into said perforations are coated with $Si_3N_4$ to form coating layers for prevention of gas passage either into or from said protective pipe via said perforations.

13. A thermocouple structure as claimed in claim 12, wherein an exposed surface area of said filling member in said perforations formed across the wall of said protective pipe are coated with an Ag—Cu—Ti powder, with which a fitting is sealed to said filling member to fix said fitting around said other end portion of said protective pipe.

14. A thermocouple structure as claimed in claim 12, wherein said protective pipe and said coating layers formed on said filling member include SiC.

15. A thermocouple structure as claimed in claim 11, wherein one of said conductor wires includes W-5% Re, and the other conductor wire is made of W-26% Re, and wherein an insulating layer made of a ceramic powder is formed around the periphery of at least one of said conductor wires by coating.

16. A thermocouple structure as claimed in claim 11, wherein said temperature-sensing portion formed in said one end portion of said protective pipe comprises a lid member for occlusion of said one end portion of said protective pipe.

17. A thermocouple structure as claimed in claim 11, wherein a glass layer comprising $Y_2O_3$, $Al_2O_3$ and $SiO_2$ is applied on said other end portion of said protective pipe on the side of said connectors to hermetically seal said other end portion of said protective pipe.

18. A thermocouple structure as claimed in claim 11, wherein said conductor wires are bent in a spiral form to absorb a difference in thermal expansion.

19. A thermocouple structure comprising a protective pipe made of a heat-resistant ceramic; a columnar insulating element including a TiN—$Si_3N_4$ composite material and fitted in said protective pipe; a pair of printed conductor strips differing in material and printed on the outer periphery of said insulating element to extend from one end thereof to the other end thereof in the longitudinal direction thereof in a state of being spaced away from each other; a temperature-sensing portion connected to both ends of said printed strips and formed in one end portion of said protective pipe; and connectors provided on the other end portion of said protective pipe and respectively connected to said printed strips.

20. A thermocouple structure as claimed in claim 19, wherein said composite material constituting said insulating element constitutes an insulating covering element covering the outer periphery of a columnar substrate disposed in said protective pipe.

21. A thermocouple structure as claimed in claim 19, wherein one of said printed strips includes W-5% Re, and the other printed strip includes W-26% Re.

22. A thermocouple structure as claimed in claim 19, wherein said protective pipe includes any one material of $Si_3N_4$ and SiC.

23. A thermocouple structure as claimed in claim 19, wherein said temperature-sensing portion is formed by sintering a thin film including any one material of $Si_3N_4$ and SiC and formed in said one end portion of said protective pipe by coating.

24. A thermocouple structure as claimed in claim 19, wherein said connectors provided on said other end portion of said protective pipe include lead wires respectively connected to said printed strips by metallization thereof with an Ag—Cu—Ti powder.

25. A thermocouple structure as claimed in claim 24, wherein said printed strips are respectively joined to said lead wires to avoid mutual short-circuit thereof on an $Al_2O_3$ tube disposed around the outer periphery of a portion of said insulating element protruding from said protective pipe.

26. A thermocouple structure as claimed in claim 19, wherein the exposed surface areas of said insulating element where said printed strips are not printed is adhered to the inner surface of said protective pipe.

* * * * *